US011019265B1

(12) United States Patent
Sommese et al.

(10) Patent No.: US 11,019,265 B1
(45) Date of Patent: May 25, 2021

(54) OPTIMIZED MOTION COMPENSATION VIA FAST STEERING MIRROR AND ROLL AXIS GIMBAL

(71) Applicant: BAE SYSTEMS Information and Electronic Systems Integration Inc., Nashua, NH (US)

(72) Inventors: Anthony M. Sommese, Eatons Neck, NY (US); Daniel Engheben, Commack, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/088,825

(22) Filed: Nov. 4, 2020

(51) Int. Cl.
*H04N 5/232* (2006.01)

(52) U.S. Cl.
CPC ....... *H04N 5/2328* (2013.01); *H04N 5/23222* (2013.01); *H04N 5/23299* (2018.08)

(58) Field of Classification Search
CPC ............ H04N 5/2328; H04N 5/23299; H04N 5/23222; G01S 17/86; G01S 17/66; G01S 3/7864; F41G 3/147; F41G 3/145; F41G 3/22; G02B 23/02; G02B 26/0816; G02B 27/644; F21V 21/30; F21V 5/00; B64D 47/08; G01J 3/2823; G01J 3/0289; G01J 3/0202
USPC ..................................................... 348/208.7
See application file for complete search history.

(56) References Cited

U.S. PATENT DOCUMENTS

| | | | |
|---|---|---|---|
| 5,663,825 A | 9/1997 | Amon et al. | |
| 6,271,877 B1* | 8/2001 | LeCompte | G01C 11/025 348/144 |
| 6,856,437 B2 | 2/2005 | Witt et al. | |
| 7,136,726 B2* | 11/2006 | Greenfeld | F41G 5/14 701/3 |
| 8,385,065 B2* | 2/2013 | Weaver | G03B 17/55 361/695 |
| 8,527,115 B2* | 9/2013 | Greenfeld | G01C 11/02 701/3 |
| 8,938,161 B2 | 1/2015 | Webb et al. | |
| 8,984,757 B2* | 3/2015 | Nakamura | G01S 3/7864 33/286 |
| 9,074,854 B2* | 7/2015 | Krupkin | G01S 7/4804 |
| 9,435,520 B2* | 9/2016 | Segerstrom | F21V 21/30 |
| 9,794,483 B1* | 10/2017 | Robinson | G06T 7/251 |
| 10,189,580 B2* | 1/2019 | Lorell | B64C 39/024 |
| 2005/0177307 A1* | 8/2005 | Greenfeld | G01C 21/165 701/409 |
| 2009/0260511 A1 | 10/2009 | Melnychuk et al. | |
| 2011/0304737 A1* | 12/2011 | Evans | G01S 3/7864 348/169 |
| 2014/0049643 A1 | 2/2014 | Segerstrom et al. | |

(Continued)

FOREIGN PATENT DOCUMENTS

EP 0664499 6/1999

*Primary Examiner* — Pritham D Prabhakher
(74) *Attorney, Agent, or Firm* — KPIP Law, PLLC

(57) ABSTRACT

A system and method for motion compensation in translational and rotational image smear using a two-axis fast steering mirror and a single-axis gimbal which are controlled simultaneously. A pointing and control module calculates an objective function which can be optimized to find an optimized de-roll rate to compensate for camera boresight rotation in real-time.

14 Claims, 10 Drawing Sheets
(8 of 10 Drawing Sheet(s) Filed in Color)

(56) References Cited

U.S. PATENT DOCUMENTS

2019/0306407 A1\* 10/2019 Ely .................... H04N 5/23216
2020/0073107 A1\* 3/2020 Muzilla .................... G03B 5/00

\* cited by examiner

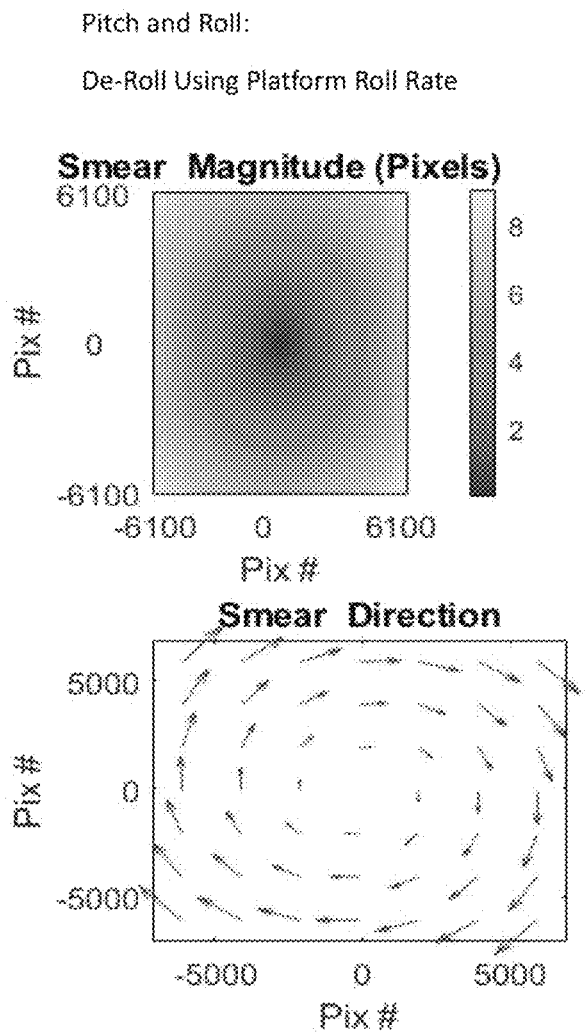
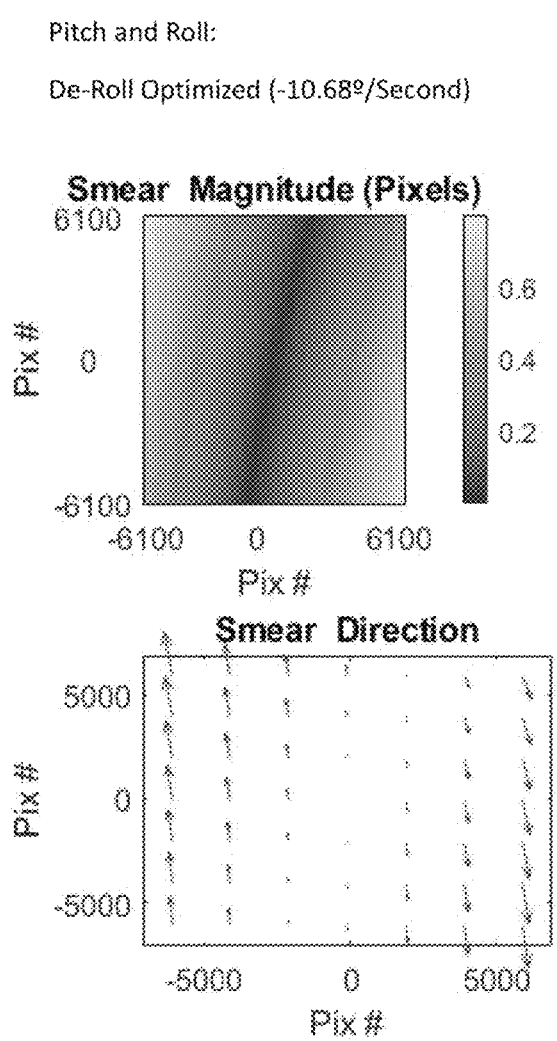
FIG. 3C
PRIRO ART
FIG. 3D

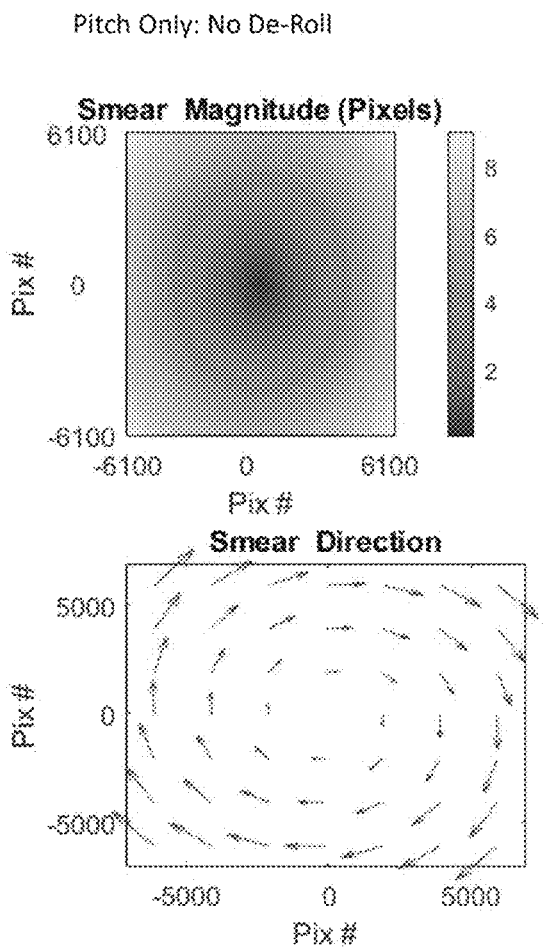 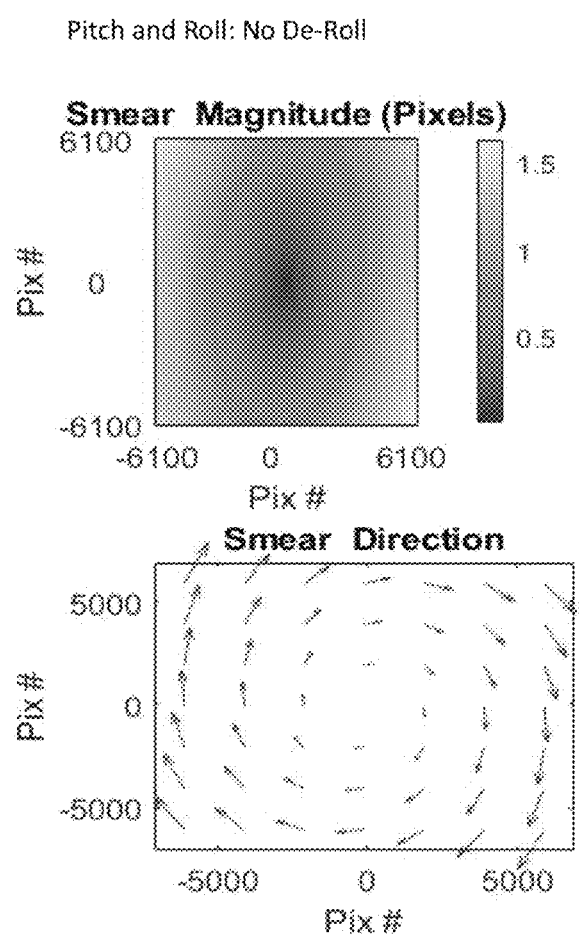
FIG. 4A
PRIOR ART
FIG. 4B
PRIOR ART

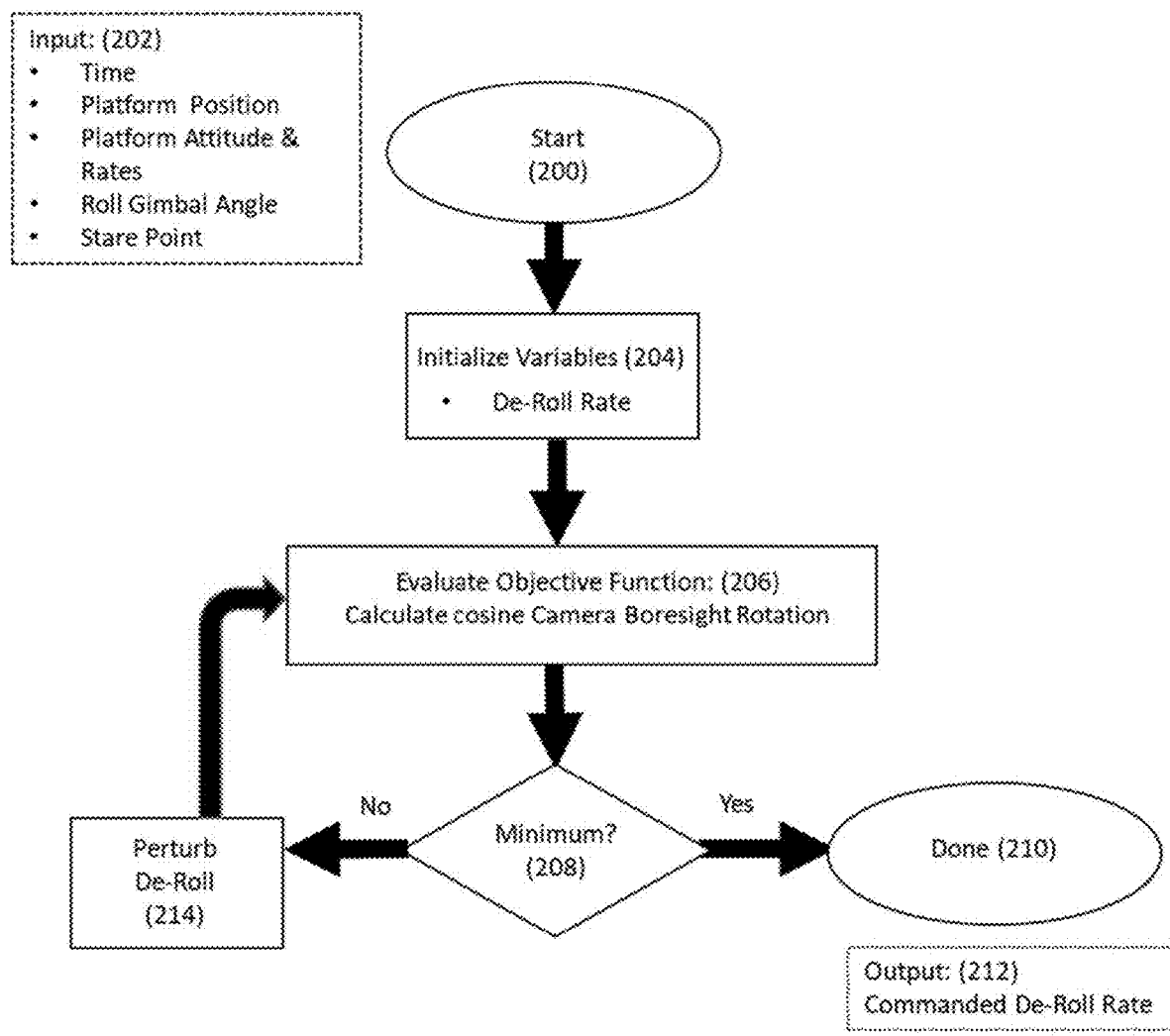

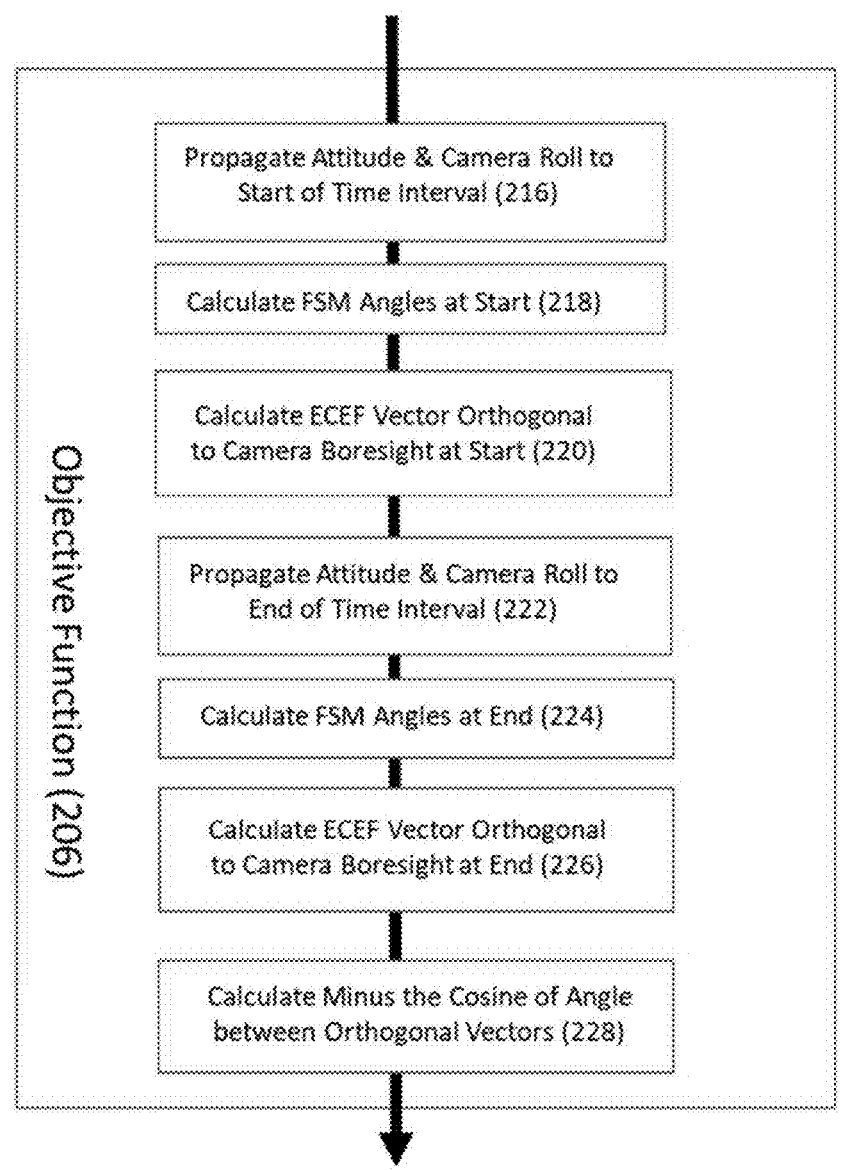

OPTIMIZED MOTION COMPENSATION VIA FAST STEERING MIRROR AND ROLL AXIS GIMBAL

STATEMENT OF GOVERNMENT INTEREST

This disclosure was made with United States Government support under Contract No. S19CNE185, awarded by Unknown Agency. The United States Government has certain rights in this disclosure.

FIELD OF THE DISCLOSURE

The present disclosure relates to motion compensation on image smear for motion and image smear including rotations about the camera boresight.

BACKGROUND OF THE DISCLOSURE

Existing solutions for compensating for image smear caused by platform motion fall into one of three categories: 1) ignore image rotation about the camera boresight and limit acceptable platform dynamics for image collection, and therefore reduce time available for image collection; 2) use of an embedded sensor within a fully turreted system that performs motion compensation, which is costly; and 3) use of a de-coupled control algorithm where a roll gimbal and fast steering mirror (FSM) angles are controlled separately. This third option allows for only the platform roll to be compensated for (when the roll gimbal is aligned with the roll axis of the platform). However, since the third method uses de-coupled controls it cannot control rotation about the camera boresight, which is especially important for image quality. It has been shown that mitigating platform roll sometimes decreases the rotation about the camera boresight but at other times increases the rotation about the camera boresight. Therefore, on average, the third option performs only as well as a strategy that does not compensate for platform roll at all and only uses FSM angles.

The present solution provides superb image compensation over a wide range of platform maneuvers (pitch, roll, yaw) all while minimizing the need for additional hardware (i.e. a fully turreted system). Therefore, it is an object of the present disclosure to overcome the above-mentioned shortcomings and drawbacks associated with the conventional solutions for compensating for image smear caused by platform motion.

SUMMARY OF THE DISCLOSURE

One aspect of the present disclosure is a system for minimizing image translation and rotation, comprising: a pointing and control module configured to simultaneously control two fast steering mirror angles and an axis of a roll gimbal; the roll gimbal provides measured roll information to the pointing and control module and, in turn, the pointing and control module provides the roll gimbal with commanded roll and rate information; and a two-axis fast steering mirror provides measured fast steering mirror angles to the pointing and control module and, in turn, the pointing and control module provides the two-axis fast steering mirror with commanded fast steering mirror angles and rate information; wherein the pointing and control module further receives as input platform position and velocity information and inertial sensor attitude and rates; the pointing and control module simultaneously control the fast steering mirror and the roll gimbal to minimize image smear for an image collected about a latitude, longitude, and altitude of an area of interest.

One embodiment of the system for minimizing image translation and rotation further comprises calculating an objective function to minimize a rate about a camera's boresight while simultaneously maintaining a stare point.

Another embodiment of the system for minimizing image translation and rotation further comprises calculating an objective function which provides an image boresight rotation rate as a function of measured platform dynamics and the fast steering mirror and roll gimbal control parameters.

Yet another embodiment of the system for minimizing image translation and rotation further comprises optimizing the objective function to find the minimum of the objective function to apply as a de-roll rate. In some cases, motion compensation in image smear is in real-time.

Another aspect of the present disclosure is a method of minimizing image boresight rotation, comprising: simultaneously controlling two fast steering mirror angles and an axis of a roll gimbal via a pointing and control module; providing measured roll information to the pointing and control module via the roll gimbal; providing measured fast steering mirror angles to the pointing and control module via a two-axis fast steering mirror; providing platform position and velocity information and inertial sensor attitude and rates to the pointing and control module; providing the roll gimbal with commanded roll and rate information via the pointing and control module; and providing the two-axis fast steering mirror with commanded fast steering mirror angles and rate information via the pointing and control module; wherein the pointing and control module minimizes image smear about a latitude, longitude, and altitude of an area of interest.

One embodiment of the method for minimizing image translation and rotation further comprises calculating an objective function to minimize a rate about a camera's boresight while simultaneously maintaining a stare point.

Another embodiment of the method for minimizing image translation and rotation further comprises calculating an objective function which provides an image boresight rotation rate as a function of measured platform dynamics and the fast steering mirror and roll gimbal control parameters.

Yet another embodiment of the method for minimizing image translation and rotation further comprises optimizing the objective function to find the minimum of the objective function to apply as a de-roll rate. In some cases, motion compensation in image smear is in real-time.

Yet another aspect of the present disclosure is a method for minimizing image translation and rotation, comprising: using an objective function, the function comprising: propagating attitude and camera roll to a start of a control time interval; calculating fast steering mirror (FSM) angles that center a camera boresight vector on a stare point the start of the time interval; calculating a rotation matrix from the camera to earth centered, earth focused (ECEF) coordinates using the fast steering mirror (FSM) angles at the start of the time interval; propagating attitude and camera roll to an end of the time interval; calculating the fast steering mirror (FSM) angles that center the camera boresight vector on the stare point at the end of the time interval; calculating a rotation matrix from the camera to earth centered, earth focused (ECEF) coordinates using the fast steering mirror (FSM) angles to the end of the time interval; producing minus a cosine of a total angle an image has rotated over the time interval; and iterating until a minimum of the objective function has been reached.

One embodiment of the method for minimizing image translation and rotation is wherein the control time interval is chosen so that platform motion is negligible and a dot product of two earth centered, earth focused (ECEF) orthogonal vectors is a measure of total boresight rotation over the control time interval.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 3C shows plots of impact of pitch and roll, and de-rolling, for a conventional system using platform pitch and roll rates, a roll gimbal, and de-coupled fast steering mirror (FSM) correction on focal plane smearing, where the platform pitch rate is 5°/sec, and the platform roll rate is 5°/sec.

FIG. 3D shows plots of impact of pitch and roll, and de-rolling with an optimized de-roll (~10.68°/sec) rate using platform pitch and roll rates, and a roll gimbal coupled with fast steering mirror (FSM) correction, on focal plane smearing, where the platform pitch rate is 5°/sec, and the platform roll rate is 5°/sec according to one embodiment of the present disclosure.

FIG. 4A shows plots of impact of pitch only, no de-rolling, for a conventional system using fast steering mirror (FSM) correction to limit focal plane smearing at the camera boresight, where the platform pitch rate is 5°/sec.

FIG. 4B shows plots of impact of pitch and roll, no de-rolling, for a conventional system using fast steering mirror (FSM) correction to limit smearing at the camera boresight, where the platform pitch rate is 5°/sec, and the platform roll rate is −5°/sec.

FIG. 7A is a flowchart of one embodiment of a method of motion compensation in image smear using fast steering mirrors and a roll axis gimbal according to one embodiment of the present disclosure.

FIG. 7B is a flowchart of one embodiment of one step in a method of motion compensation in image smear using fast steering mirrors and a roll axis gimbal according to one embodiment of the present disclosure.

DETAILED DESCRIPTION OF THE DISCLOSURE

Figure 1:
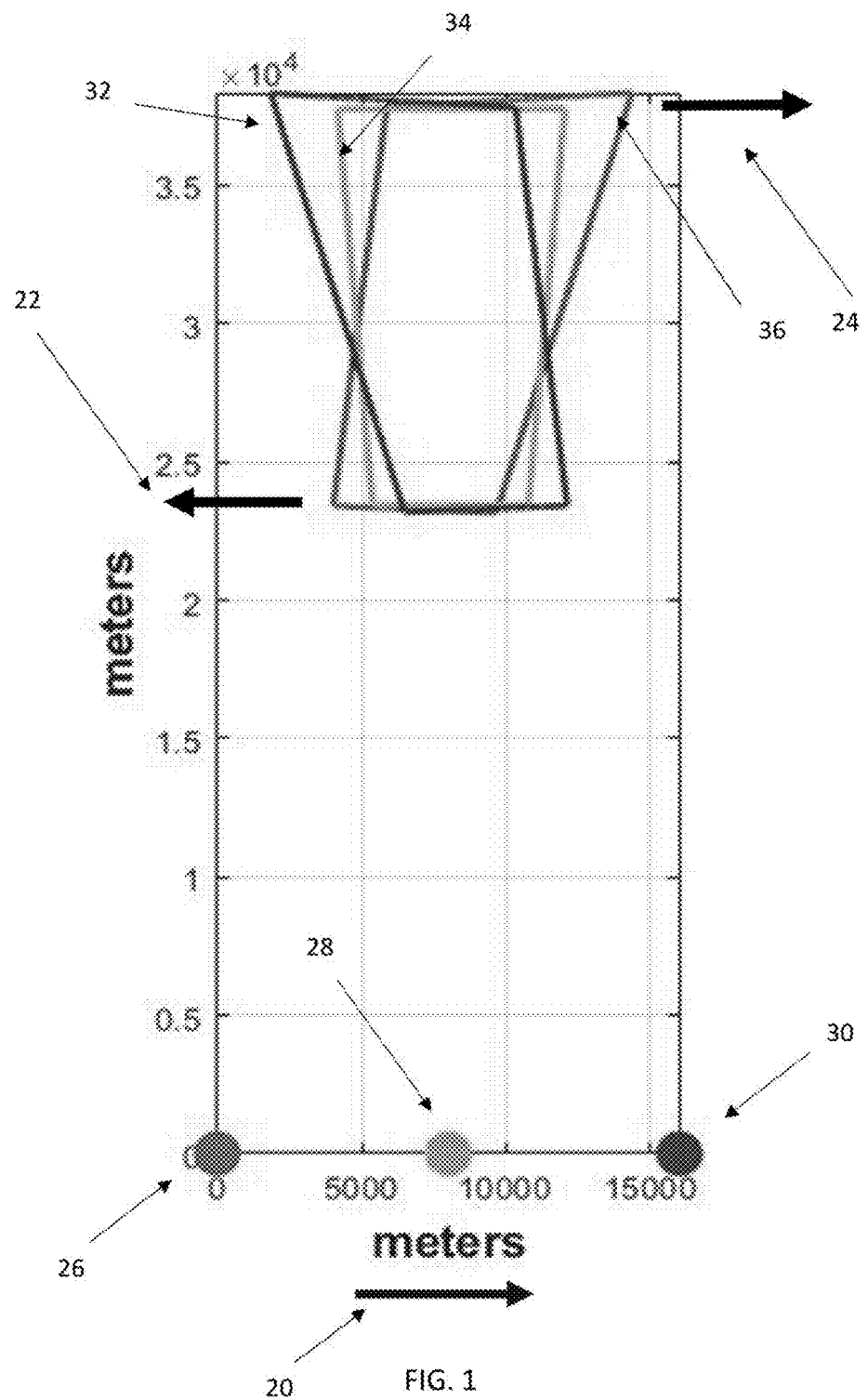
FIG. 1 shows a diagram of conventional focal plane to ground mapping in a stare mode example with no platform rotation.

In one embodiment of the present disclosure, advanced wide area motion imagery (WAMI) efforts have integrated large format IR arrays with a state-of-the-art fast steering mirror (FSM) to provide an agile sensor that can cover a large field-of-regard, and instantaneously, a large field-of-view (FOV). It is recognized that image quality is extremely sensitive to pixel smearing over the integration period resulting from platform motion (both translational and rotational due to changes in attitude). Due to the size of the FOV, image quality is particularly impacted by rotations about the camera's boresight.

A FSM by itself can be used to stabilize the boresight pixel over the integration period, and reduce the impact of platform translation on the degradation in image quality, but it cannot compensate for rotations about the camera's boresight that are induced by platform rotations (roll, pitch, and yaw). If boresight rotation is not accounted for then this puts constraints on the way the platform may operate while imaging, and therefore reduces the collection time that is available for a specific mission.

One solution for controlling boresight rotation is to use a turret with enough degrees of freedom to perform image motion compensation, but this is extremely costly. In contrast, the solution described herein controls both a single-axis (i.e. roll axis) gimbal system and a two-axis FSM simultaneously to reduce the impact of camera boresight rotation on image quality, and therefore improves performance and extends the range of platform motions for which high quality image collection is possible. As one can imagine, using a single-axis gimbal is much less costly than using a fully turreted system.

Current state-of-the-art stabilization systems that use a roll gimbal and FSM control them separately, where the roll gimbal is used to compensate only for platform roll, but does not mitigate rotation about the camera's boresight, which is what is really needed to improve image quality.

One embodiment of the present disclosure mitigates the impact to image quality over a large FOV resulting from platform motion by using an algorithm that simultaneously optimizes both the FSM angles and their rates, as well as a single axis gimbal angle and its rate to perform motion compensation over the integration time. An objective function as described herein provides the image boresight rotation rate as a function of measured platform dynamics and the FSM and gimbal control parameters. A current implementation uses a procedure for the objective function as described in the flow chart shown in FIG. 7A, where under certain configurations/assumptions the objective function can reduce to a simple mathematical equation. In addition, a simple optimization procedure is used to find the FSM and gimbal control parameters (angles and their rates) which minimizes the objective function, thus making the method and system of motion compensation in image smear of the present disclosure amenable for real-time control.

In certain embodiments, uses of this method and system can include other multi-axis gimbal arrangements that are used for stabilization of the line-of-sight (LOS) during platform attitude maneuvers. The application of FSM and roll gimbal techniques to stabilize LOS shows appreciable reduction in the image smearing. Certain embodiments provide a solution for reducing rotational pixel smear while also reducing the turret requirements.

Referring to FIG. 1, a diagram of focal plane to ground mapping over time according to one embodiment of the present disclosure is shown. Platform motion and attitude change during an integration induces pixel motion relative to the ground, thus distorting the image. Some distortions can be taken out using the FSM and/or roll gimbal. More specifically, for each frame, a sensor integrates photons for a nominal time, and a FSM is used to keep the camera boresight locked onto a desired ground stare point (ground spot that remains in center of FOV and has no motion in focal plane coordinates) while the platform is in motion 20. Over time, at the top of the array a spot on the ground is shown as moving outward in focal plane coordinates 24. A similar affect occurs at the bottom of the array 22 and causes image shear. Patterns shown are for a relatively long (e.g., tens of seconds) time interval. Certain embodiments have a similar pattern over the integration interval and are typically much smaller in magnitude, but still cause the image quality to degrade if not controlled.

Figures 2A, 2B:
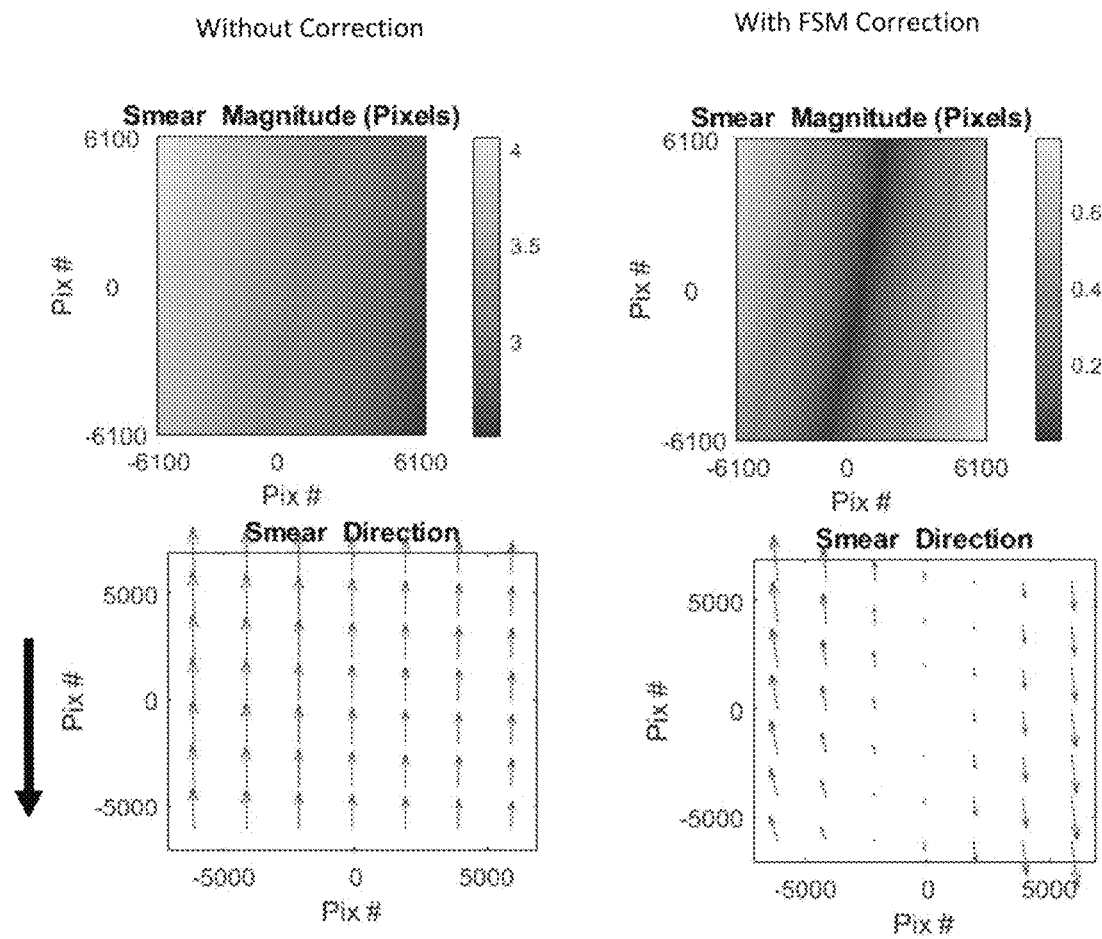
FIG. 2A shows plots of focal plane smearing where the platform attitude is constant over an integration interval with no correction.
FIG. 2B shows plots of focal plane smearing where the platform attitude is constant over the integration interval with only fast steering mirror (FSM) correction.

Referring to FIG. 2A, plots of focal plane smearing where the platform attitude is constant over an integration interval with no correction are shown. The direction of platform motion is shown as an arrow and a plot of smear magnitude (pixels) and a plot of smear direction are shown. Referring to FIG. 2B, plots of focal plane smearing where the platform attitude is constant over the integration interval with only FSM correction are shown. More specifically, for straight and level flights a FSM can be used to reduce smear from three or four pixels over the integration period to less than one pixel. The residual smear is due to the image shearing described in FIG. 1 and cannot be improved upon using a global correction. In certain embodiments, residue smear is less than the spot size of the optical system.

Figures 3A, 3B:
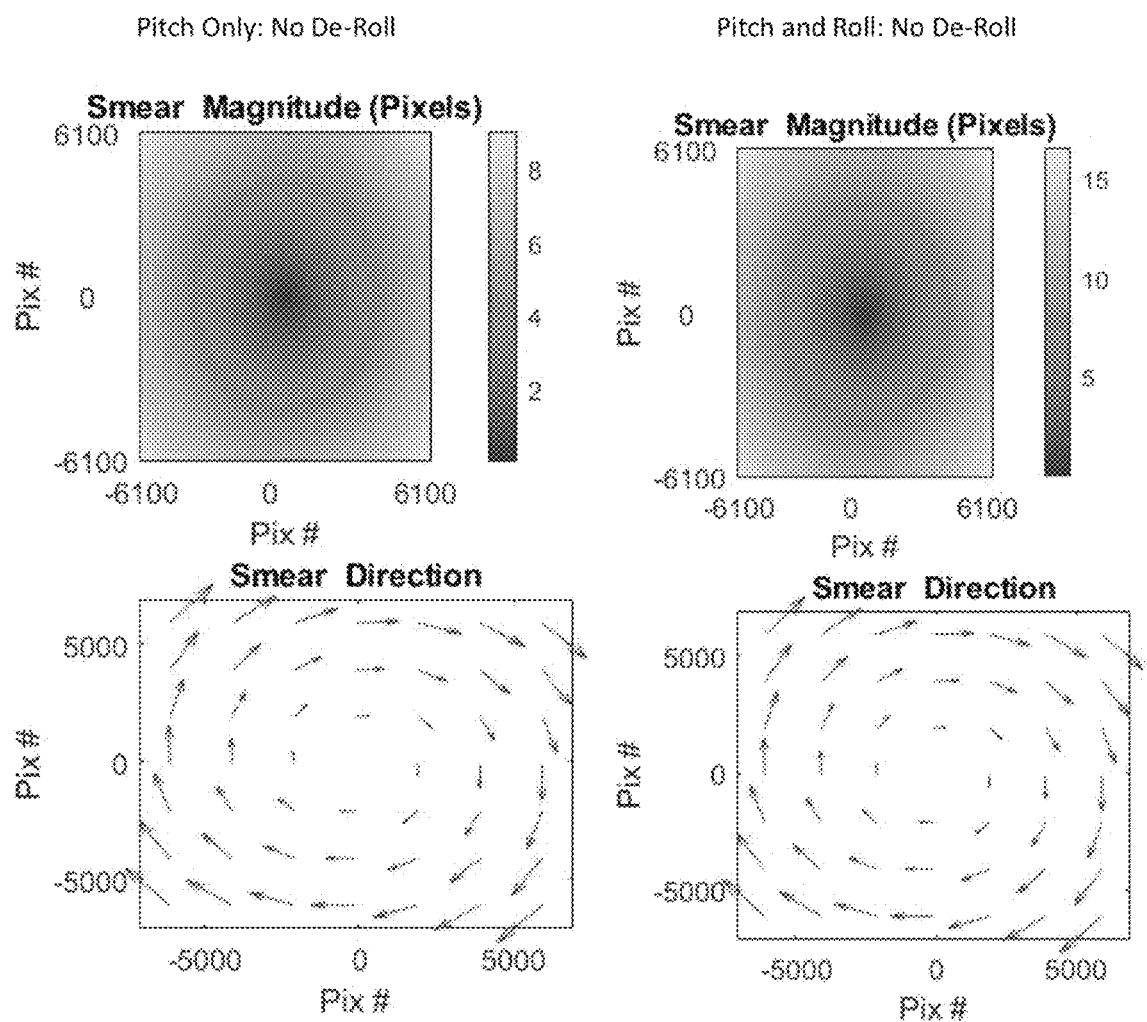
FIG. 3A shows plots of impact of pitch only, no de-rolling, for a conventional system using fast steering mirror (FSM) correction to limit focal plane smearing at the camera boresight, where the platform pitch rate is 5°.
FIG. 3B shows plots of impact of pitch and roll, no de-rolling, for a conventional system using fast steering mirror (FSM) correction to limit focal plane smearing at the camera boresight, where the platform pitch rate is 5°/sec, and the platform roll rate is 5°/sec.

Referring to FIG. 3A, plots of impact of pitch only, no de-rolling, for a conventional system using fast steering mirror (FSM) correction to limit focal plane smearing at the camera boresight, where the platform pitch rate is 5° are shown. More specifically, a plot of smear magnitude (pixels) and a plot of smear direction are shown. From the figure, the vector plot shows the residual rotation about the boresight with zero at the center of the focal plane and the magnitude of the smear increasing with pixel radius and constant for a given radius.

Referring to FIG. 3B, plots of impact of pitch and roll, no de-rolling, for a conventional system using fast steering mirror (FSM) correction to limit focal plane smearing at the camera boresight, where the platform pitch rate is 5°/sec, and the platform roll rate is 5°/sec are shown. More specifically, a plot of smear magnitude (pixels) and a plot of smear direction are shown. For this case, platform pitch and roll reinforce each other to increase the rotation rate about the boresight raising the smear magnitude for the edge pixel from about eight pixels when there is only pitch to about fifteen pixels when there is pitch and roll.

Referring to FIG. 3C, plots of impact of pitch and roll, and de-rolling, for a conventional system using platform pitch and roll rates, a roll gimbal, and de-coupled fast steering mirror (FSM) correction on focal plane smearing, where the platform pitch rate is 5°/sec, and the platform roll rate is 5°/sec are shown. More specifically, a plot of smear magnitude (pixels) and a plot of smear direction are shown. Here a gimbal and an FSM are controlled separately. For this case, using the platform roll rate to de-roll the image (which is the current state-of-the art) eliminates some of the boresight rotation the part due to platform roll), but leaves a residual rotation (the part due to pitch). The reduction in smear only occurs because as is shown in FIG. 3B platform pitch and roll induce boresight rotation in the same direction and therefore add together. This is not always the case as will be shown below.

Referring to FIG. 3D, plots of impact of pitch and roll, and de-rolling with an optimized de-roll (−10.674°/sec) rate using platform pitch and roll rates, and a roll gimbal coupled with fast steering mirror (FSM) correction, on focal plane smearing, where the platform pitch rate is 5°/sec, and the platform roll rate is 5/sec according to one embodiment of the present disclosure are shown. Calculation of the optimized roll rate (−10.674°/sec) uses the optimized objective function described herein. More specifically, a plot of smear magnitude (pixels) and a plot of smear direction are shown. Here, control of the FSM and the roll gimbal are simultaneous. The three axes (two for FSM and one for gimbal) are not totally orthogonal but do span the three-dimensional subspace. As shown, the residual rotation about the boresight has been dramatically reduced over the state-of-the-art (FIG. 3.C) and the smear is now equivalent to straight and level (FIG. 2B) case.

Referring to FIG. 4A, plots of impact of pitch only, no de-rolling, for a conventional system using FSM correction to stabilize the center of the array on focal plane smearing where the platform pitch rate is 5°/sec. More specifically, a plot of smear magnitude (pixels) and a plot of smear direction are shown.

Referring to FIG. 4B, plots of impact of pitch and roll, no de-rolling, for a conventional system using FSM correction to stabilize the center of the array on focal plane smearing where the platform pitch rate is 5°/sec, and the platform roll rate is −5°/sec are shown. More specifically, a plot of smear magnitude (pixels) and a plot of smear direction are shown. In this case, platform roll and pitch produce boresight rotations in different directions and somewhat cancel each other out. This cancellation is illustrated in the figure, since for the case of platform pitch only the smear for an edge pixel is about eight pixels over the integration period, while when platform roll is included the smear is reduced to about 1.5 pixels.

Figures 4C, 4D:
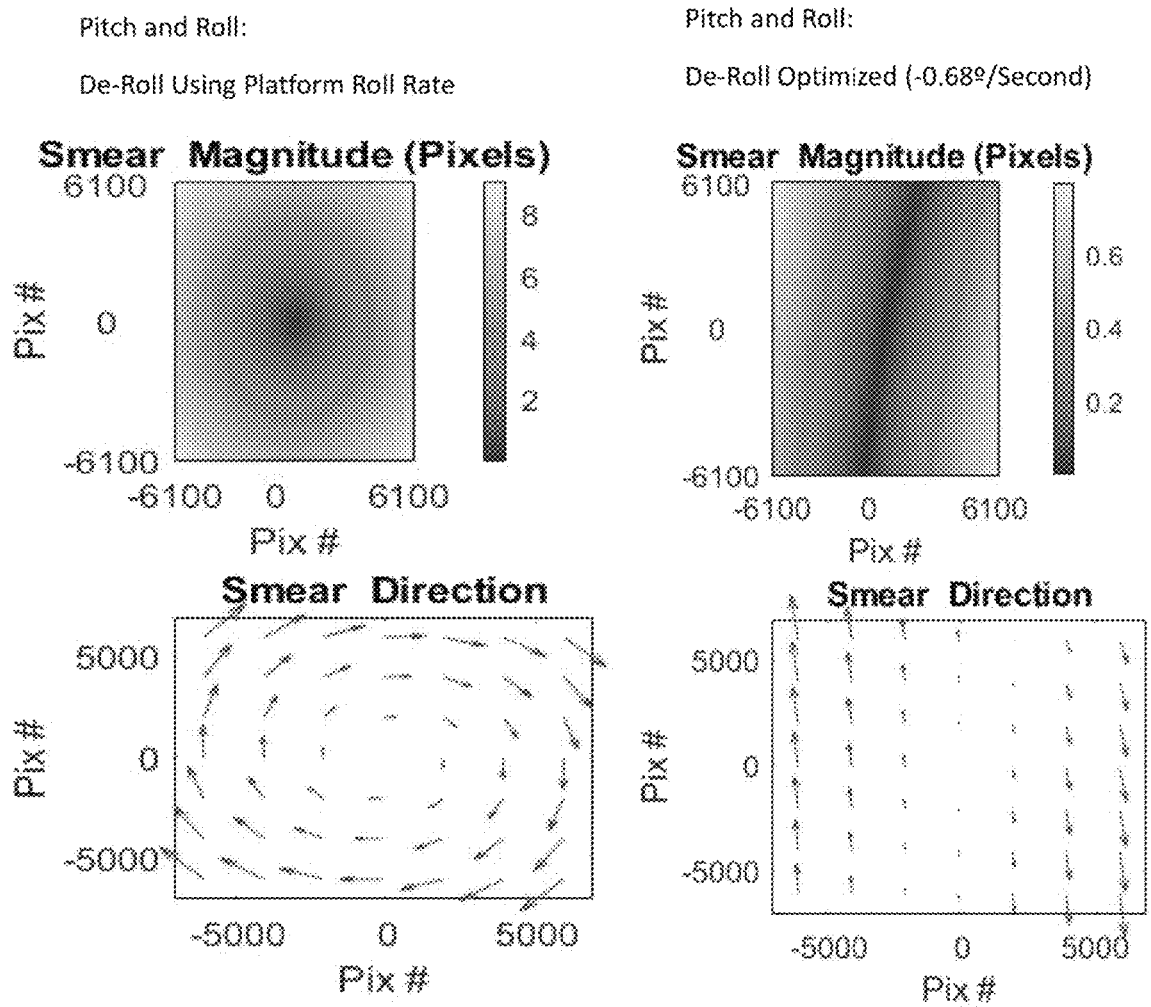
FIG. 4C shows plots of impact of pitch and roll, and de-rolling, for a conventional system using platform pitch and roll rates, a roll gimbal, and de-coupled fast steering mirror (FSM) correction on focal plane smearing where the platform pitch rate is 5°/sec, and the platform roll rate is −5°/sec.
FIG. 4D shows plots of impact of pitch and roll, and de-rolling with an optimized de-roll rate (−0.68°/sec) using platform pitch and roll rates, and a roll gimbal coupled with fast steering mirror (FSM) correction on focal plane smearing where the platform pitch rate is 5°/sec, and the platform roll rate is −5°/sec according to one embodiment of the present disclosure.

Referring to FIG. 4C, plots of impact of pitch and roll, and de-rolling, for a conventional system using platform pitch and roll rates, a roll gimbal, and FSM correction to stabilize the center of the array on focal plane smearing, where the platform pitch rate is 5°/sec, and the platform roll rate is −5°/sec are shown. More specifically, a plot of smear magnitude (pixels) and a plot of smear direction are shown. In certain embodiments, platform rates (roll and pitch) cancel each other to a degree and de-rolling based only on platform roll rate makes image smear worse as illustrated in the figure. Here, the gimbal and FSM are controlled separately.

Referring to FIG. 4D, plots of impact of pitch and roll, and de-rolling with an optimized de-roll rate (−0.674°/sec) using roll gimbal and coupled gimbal control on focal plane smearing where the platform pitch rate is 5/sec, and the platform roll rate is −5°/sec according to one embodiment of the present disclosure are shown. More specifically, a plot of smear magnitude (pixels) and a plot of smear direction are shown. The optimized de-roll rate is calculated using the objective function described herein. Once gain pixel smear is reduced to what is obtained with straight and level flight.

One embodiment of the system for the system for optimized motion compensation using a fast steering mirror and a roll axis gimbal uses an objective function to minimize the rate about the camera's boresight while simultaneously maintaining the stare point (See, e.g., FIG. 7B). There, $\alpha = -\cos(\Delta BoresightRoll) = f(\dot{\theta}_{CameraRoll}, \hat{\iota}_{ECHF_{Stare}}; V)$ where V is the vector that contains information regarding the platform position, velocity, attitude, and attitude rates (at the center of the control time interval). The integration interval may be broken up into smaller control time intervals so that higher frequency maneuvers can be corrected. Note that $\alpha$ is the cosine of the total camera boresight rotation angle that would occur over the control time interval, and therefore, is the parameter to be minimized. It is a function of parameters that are inputs and cannot be controlled (i.e. the stare point and platform attitude) and others that are outputs and can be controlled like the FSM angles and camera roll rate (via a roll gimbal).

Given a Control Time Interval (T), the FSM angles are captured at the start of the 1 control time interval:

$$\theta_{PlatformRoll} = \theta_{PlatformRoll} - \dot{\theta}_{PlatformRoll} \tfrac{1}{2}T$$

$$\theta_{PlatformPitch} = \theta_{PlatformPitch} - \dot{\theta}_{PlatformPitch} \tfrac{1}{2}T$$

$$\theta_{PlatformYaw} = \theta_{PlatformYaw} - \dot{\theta}_{PlatformYaw} \tfrac{1}{2}T$$

$$\theta_{CameraRoll} = \theta_{CameraRoll} - \dot{\theta}_{CameraRoll} \tfrac{1}{2}T$$

$$(\theta_{Inner\_Start}, \theta_{Outer\_Start}) = f_1(\hat{\iota}_{ECEF_{Stare}}; V_{start})$$

The FSM angles are captured at the end of the control time interval:

$$\theta_{PlatformRoll} = \theta_{PlatformRoll} + \dot{\theta}_{PlatformRoll} \tfrac{1}{2}T$$

$$\theta_{PlatformPitch} = \theta_{PlatformPitch} + \dot{\theta}_{PlatformPitch} \tfrac{1}{2}T$$

$$\theta_{PlatformYaw} = \theta_{PlatformYaw} + \dot{\theta}_{PlatformYaw} \tfrac{1}{2}T$$

$$\theta_{CameraRoll} = \theta_{CameraRoll} + \dot{\theta}_{CameraRoll} \tfrac{1}{2}T$$

$$(\theta_{Inner\_End}, \theta_{Outer\_End}) = f_1(\hat{\iota}_{ECEF_{Stare}}; V_{end})$$

In some embodiments, $V_{end}$ includes new platform attitude angles and ignores platform motion for simplicity, while ECEF boresight (determined by the stare point) remains the same. A vector orthogonal to the boresight is then selected and converted to ECEF at the start and at the end. The function, $f_1$ calculates the FSM angles needed to have the focal plane ECEF boresight vector pass through the stare point.

$$\hat{\iota}_{ECFOrthogonalStart} = R_{Pixel2ECF}(\theta_{Inner\_Start}, \theta_{Outer\_Start}, V_{start}) \hat{\iota}_{OrthogonalBoresight}$$

$$\hat{\iota}_{ECFOrthogonalEnd} = R_{Pixel2ECF}(\theta_{Inner\_End}, \theta_{Outer\_End}, V_{start}) \hat{\iota}_{OrthogonalBoresight}$$

The dot product is calculated:

$$\alpha = -\hat{\iota}_{ECFOrthogonalStart} \cdot \hat{\iota}_{ECFOrthogonalEnd}$$

Figure 5A:
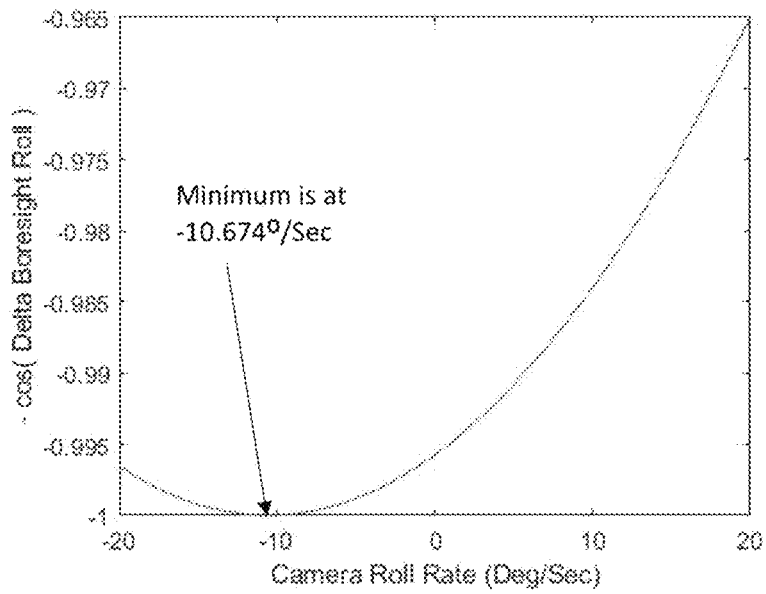
FIG. 5A is a plot of the optimization function that minimizes smear for fully coupled fast steering mirror (FSM) and roll gimbal control where the platform pitch rate is 5°/sec and, platform roll rate is 5°/sec according to one embodiment of the present disclosure.

Referring to FIG. 5A, a plot of an optimized function according to one embodiment of the present disclosure is shown. More specifically, the platform roll rate is 5°/sec and the platform pitch rate is 5°/sec. The minimum of the function is −10.674°/sec. In certain embodiments, the objective function is a quadratic and the minimum can be found with simple algorithms (e.g., steepest decent, etc.).

Figure 5B:
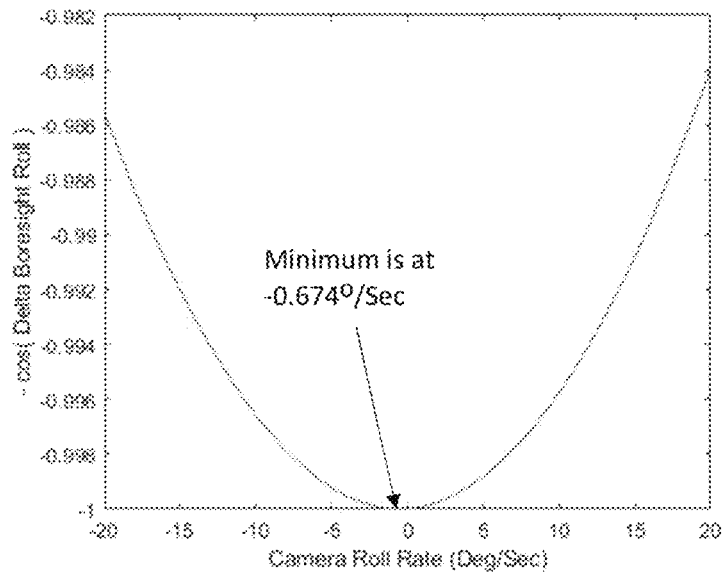
FIG. 5B is a plot of the optimization function that minimizes smear for fully coupled fast steering mirror (FSM) and roll gimbal control where the platform pitch rate is 5°/sec, and platform roll rate is −5°/sec according to another embodiment of the present disclosure.

Referring to FIG. 5B, a plot of an optimized function according to another embodiment of the present disclosure is shown. More specifically, the platform roll rate is −5°/second and the platform pitch rate is 5/second. There, the minimum of the function is −0.674°/second.

Regarding residual rotation about the camera boresight, combinations of platform attitude rates can either reinforce or cancel each other after FSM correction (See, e.g., FIGS. 3C and 4C). De-rolling the camera based on platform roll rate makes smear results worse when the roll rate produces rotation about the camera boresight in an opposite direction to other attitude components. A de-coupled control system (controlling roll and FSM separately) does not provide for optimal results. In contrast, in certain embodiments, a preliminary objective function is used to minimize image smear by controlling FSM angles and de-roll simultaneously. As part of the calculation of the optimal de-roll rate the FSM angles to maintain a stare point are uniquely calculated. A roll rate that minimizes smear (rotation about the camera boresight) can them be determined (See, e.g. FIG. 5A and FIG. 5B).

Figure 6:
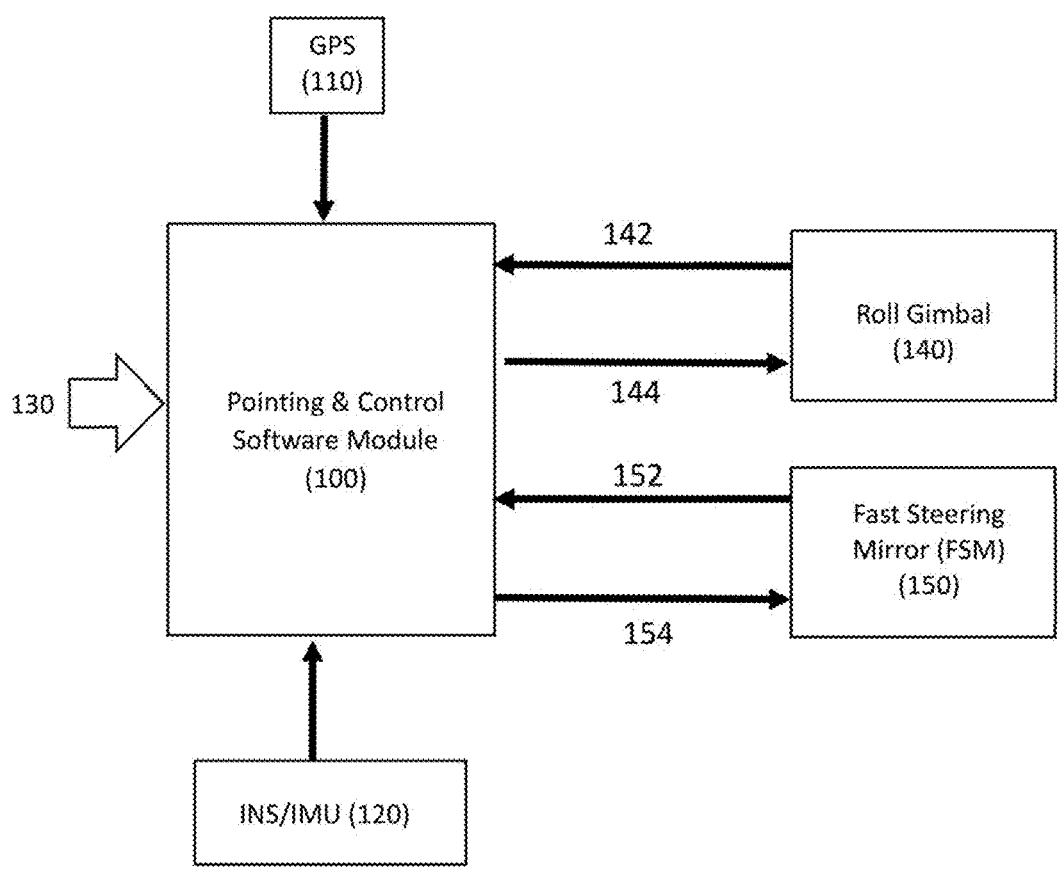
FIG. 6 is a diagram of one embodiment of a system for motion compensation in image smear using fast steering mirrors and a roll axis gimbal according to the present disclosure.

Referring to FIG. 6, a diagram of one embodiment of a system for motion compensation in image smear using fast steering mirrors and a roll axis gimbal according to the present disclosure is shown. More specifically, a pointing and control module 100 is used to minimize image translation and rotation (smear). The pointing and control module 100 is configured to control the two FSM angles and the axis of the roll gimbal simultaneously. Input into the pointing and control module includes user supplied GPS 110, which provides the platform position and velocity information. Additionally, an inertial navigation system (INS)/inertial measurement unit (IM U) 120 provides sensor attitude and rates. The stare point 130 comprises the latitude, longitude, and altitude for an area of interest. The single axis roll gimbal provides measured roll information 142 to the pointing and control module 100 and, in turn, the module provides the roll gimbal 140 with commanded roll and rate information 144. The two-axis fast steering mirror (FSM) or prism 150 provides measured FSM angles 152 to the pointing and control module 100 and, in turn, the module provides the two-axis FSM with commanded FSM angles and rate information 154.

As described here, the present disclosure uses a single gimbal axis and two FSM axes together to perform image stabilization over an integration period. The camera is on a moving platform that induces both translational (image shift) and image rotational movement about the camera's boresight axis over the integration period. Also, because a large format array (big focal plane) is used the image boresight rotation needs to be addressed because if it is not removed it will cause significant image motion at the edges of the focal plane.

Major components of the sensor assembly of the present disclosure reside in an optical bench and include a FSM, a camera, and an INS/IMU. In one embodiment, the optical bench is hosted on an aircraft and is attached to a roll gimbal, which is roughly aligned with the aircraft's roll axis. The roll gimbal is used to position the sensor assembly to look downrange to the left or right of the direction of flight. The amount of roll nominally determines how far downrange the sensor is looking. In one embodiment, a two-axis FSM, which is in front of the camera provides further pointing refinement. There, one FSM axis is roughly aligned with the direction of flight of the aircraft, allowing the camera's FOV to be steered ahead of or behind the current aircraft position. The other axis of the FSM is roughly aligned with the roll axis and allows further refinement of how far downrange the camera is positioned. In certain embodiments, the INS/IMU gives the attitude and attitude rates of the optical bench, and therefore the sensor package, and is used by the pointing algorithm to simultaneously control the two FSM angles and the roll gimbal to minimize boresight rotation during the integration interval.

Again, this is one embodiment, but this disclosure relates to minimizing boresight rotation by controlling all axes simultaneously as opposed to using roll axes to just account for aircraft roll. Other configurations are possible as long as the orientation of the three control axes provide enough degrees of freedom to reduce rotation about boresight.

Referring to FIG. 7A, a flowchart of one embodiment of a method of motion compensation in image smear using a fast steering mirror and a roll axis gimbal according to one embodiment of the present disclosure is shown. More specifically, an overall objective is to find a de-roll rate that minimizes boresight rotation to mitigate image smear. In certain embodiments of this disclosure, where the hardware (i.e. a FSM and a roll gimbal) is sufficiently configured and it is possible to know the minimum boresight roll rate a priori (i.e. zero rotation about the boresight if hardware configuration has enough degrees of freedom), a solution that minimizes the objective function is achieved without iteration. However, for a more general case, where the minimum might not be known an iterative procedure is required, as shown in FIG. 7A.

The system takes as input 202 time, the stare point, platform position and velocity, platform attitude and attitude rates, as well as the roll gimbal angle and a de-roll rate. An initial guess of de-roll is provided 204 and that guess is perturbed and iterated until a function minimum is obtained. The system produces minus the cosine of the boresight rotation angle 206. The function does this by finding vectors in ECEF (earth centered, earth focused) space that are orthogonal to the boresight at two perturbed end points and calculating the dot product between the two vectors (See, FIG. 7B for more detail). If the function reaches the minimum 208, then the method is completed 210 and the output is the commanded de-roll rate. If, the minimum 208 has not been reached then de-roll is further perturbed 214 and the objective function is once again evaluated 206.

Referring to FIG. 7B, a flowchart of one embodiment of one step of a method of motion compensation in image smear using a fast steering mirror and a roll axis gimbal according to one embodiment of the present disclosure is shown. More specifically, an objective function to be minimized 206 is defined. In one embodiment, the objective function produces minus the cosine of the total angle the image has rotated over some control time interval 228. Minus is used so that a minimization routine can be applied. According to one embodiment of the present disclosure, the orthogonal vector at an end point is determined by: propagating attitude and camera roll to a start of a time interval 216; calculating the FSM angles that center the camera boresight vector on the stare point 218 at start; using the FSM angles to calculate a rotation matrix from camera to ECEF coordinates 220 at start; propagating attitude and camera roll to a end of a time interval 222; calculating the FSM angles that center the camera boresight vector on the stare point at end 224; using the FSM angles to calculate a rotation matrix from camera to ECEF coordinates at end of time interval 226. In one embodiment the time step is chosen so that the platform motion is negligible so that the dot product of the two ECEF orthogonal vectors is a measure of the total boresight rotation over this time. Minus the cosine of angle between orthogonal vectors is then calculated 228. If the resulting value is the minimum for the objective function the iterations end. If not, the iterations continue until a minimum for the objective function has been reached (See, e.g. FIG. 7A).

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A system for minimizing an image translation and rotation, comprising:
    the image captured about a camera boresight;
    a pointing and control module configured to simultaneously control two fast steering mirror angles and an axis of a roll gimbal;
    the roll gimbal provides measured roll information to the pointing and control module and, in turn, the pointing and control module provides the roll gimbal with commanded roll and rate information; and
    a two-axis fast steering mirror provides measured fast steering mirror angles to the pointing and control module and, in turn, the pointing and control module provides the two-axis fast steering mirror with commanded last steering mirror angles and rate information;
    wherein the pointing and control module further receives as input platform position and velocity information and inertial sensor attitude and rates;
    the pointing and control module simultaneously controls the fast steering mirror and the roll gimbal to minimize image smear for the image collected about a latitude, longitude, and altitude of an area of interest.

2. The system for minimizing the image translation and rotation according to claim 1, further comprising calculating an objective function to minimize a rate about the camera's boresight while simultaneously maintaining a stare point.

3. The system for minimizing the image translation and rotation according to claim 2, further comprising optimizing the objective function to find the minimum of the objective function to apply as a dc-roll rate.

4. The system for minimizing the image translation and rotation according to claim 1, further comprising calculating an objective function which provides an image boresight rotation rate as a function of measured platform dynamics and the fast steering mirror and roll gimbal control parameters.

5. The system for minimizing the image translation and rotation according to claim 1, wherein motion compensation in image smear is in real-time.

6. A method of minimizing gr image boresight rotation, comprising:
    capturing the image about a camera boresight;
    simultaneously controlling two fast steering mirror angles and an axis of a roll gimbal via a pointing and control module;
    providing measured roll information to the pointing and control module via the roll gimbal;
    providing measured fast steering mirror angles to the pointing and control module via a two-axis fast steering mirror;
    providing platform position and velocity information and inertial sensor attitude and rates to the pointing and control module;
    providing the roll gimbal with commanded roll and rate information via the pointing and control module; and
    providing the two-axis fast steering mirror with commanded fast steering mirror angles and rate information via the pointing and control module;
    wherein the pointing and control module minimizes image smear about a latitude, longitude, and altitude of an area of interest.

7. The method for minimizing the image boresight rotation according to claim 6, further comprising calculating an objective function to minimize a rate about the camera's boresight while simultaneously maintaining a stare point.

8. The method for minimizing the image boresight rotation according to claim 7, further comprising optimizing the objective function to find the minimum of the objective function to apply as a dc-roll rate.

9. The method for minimizing the image boresight rotation according to claim 6, further comprising calculating an objective function which provides an image boresight rotation rate as a function of measured platform dynamics and the fast steering mirror and roll gimbal control parameters.

10. The method for minimizing the image boresight rotation according to claim 6, wherein motion compensation in image smear is in real-time.

11. A method for minimizing gr image translation and rotation, comprising:
    capturing the image about a camera boresight;
    using an objective function, the function comprising:
    propagating attitude and camera roll to a start of a control time interval;
    calculating fast steering mirror (FSM) angles that center a camera boresight vector on a stare point the start of the control time interval;
    calculating a rotation matrix from the camera to earth centered, earth focused (ECEF) coordinates using the fast steering mirror (FSM) angles at the start of the control time interval;
    propagating attitude and camera roll to an end of the control time interval;
    calculating the fast steering mirror (FSM) angles that center the camera boresight vector on the stare point at the end of the control time interval;

calculating a rotation matrix from the camera to earth centered, earth focused (ECEF) coordinates using the fast steering mirror (FSM) angles to the end of the control time interval;

producing minus a cosine of a total angle the image has rotated over the control time interval; and iterating until a minimum of the objective function has been reached.

12. The method for minimizing t image translation and rotation according to claim 11, wherein the control time interval is chosen so that platform motion is negligible and a dot product of two earth centered, earth focused (ECEF) orthogonal vectors is a measure of total boresight rotation over the control time interval.

13. The method for minimizing the image translation and rotation according to claim 11, wherein motion compensation in image smear is in real-time.

14. A computer program product including one or more non-transitory computer readable mediums encoded with instructions that when executed by one or more processors cause a process to be carried out for minimizing an image translation and rotation, the process comprising:

capturing the image about a camera boresight;

simultaneously controlling two fast steering mirror angles and an axis of a roll gimbal via a pointing and control module;

providing measured roll information to the pointing and control module via the roll gimbal;

providing measured fast steering mirror angles to the pointing and control module via a two-axis fast steering mirror;

providing platform position and velocity information and inertial sensor attitude and rates to the pointing and control module;

providing the roll gimbal with commanded roll and rate information via the pointing and control module; and providing the two-axis fast steering mirror with commanded fast steering mirror angles and rate information via the pointing and control module;

wherein the pointing and control module minimizes image smear about a latitude, longitude, and altitude of an area of interest.

* * * * *